United States Patent [19]

Erdmann et al.

[11] 3,855,027

[45] Dec. 17, 1974

[54] ON-SITE FABRICATION OF ANTENNAS

[75] Inventors: Manfred O. Erdmann; John J. Dolan, both of Denville, N.J.

[73] Assignee: International Telephone and Telegraph Corporation, Nutley, N.J.

[22] Filed: June 22, 1972

[21] Appl. No.: 265,365

[52] U.S. Cl................ 156/79, 156/245, 156/289, 264/32, 264/35, 264/45, 264/273, 264/314
[51] Int. Cl...... B29d 27/04, B29g 7/02, B32b 31/12
[58] Field of Search............. 156/245, 246, 289, 79; 264/32, 35, 45, 273, 314

[56] References Cited
UNITED STATES PATENTS

| | | | |
|---|---|---|---|
| 2,817,619 | 12/1957 | Bickel et al. | 264/245 |
| 3,049,464 | 8/1962 | Klima et al. | 156/245 |
| 3,161,555 | 12/1964 | Kish | 156/245 |
| 3,227,000 | 1/1966 | Gits | 156/245 |
| 3,530,208 | 9/1970 | Rausine | 264/314 X |
| 3,615,969 | 10/1971 | Hegg | 156/79 X |
| 3,668,287 | 6/1972 | Mackie | 264/32 X |
| 3,755,031 | 8/1973 | Hoffman et al. | 156/245 X |
| 3,778,492 | 12/1973 | Lemons | 264/45 |

*Primary Examiner*—Harold Ansher
*Attorney, Agent, or Firm*—John T. O'Halloran; Menotti J. Lombard, Jr.; Alfred C. Hill

[57] ABSTRACT

Large parabolic reflectors are constructed on-site from raw materials supplied in a kit, wherein the reflector is formed on an inflatable mold having a convex surface with appropriate contour. Upon inflating the mold, which may be impregnated or initially sprayed with a releasing agent, a layer of ultraviolet-sensitized polyester gel-coat or polyester resin is spray-applied thereon. Following this a predetermined number of layers of fiberglass-reinforced polyester resin is sprayed-on. Internal reinforcement ribbing pieces (e.g. plywood), having apertures therein and at least one surface corresponding in shape to the mold surface, are then radially arranged on the mold and held in place by polyester resin-sprayed fiberglass attachment fillets. Polyurethane foam is then applied, embedding and foaming in place the reinforcement pieces and also sectional pieces arranged piece by piece in concentric circles on the mold surface, with the apertures therein providing continuity between sections of cast polyurethane foam. Following this, a second laminate layer of fiberglass-reinforced polyester resin is sprayed-on. The mold is then deflated and a reflecting agent (e.g. aluminum) is sprayed onto the reflecting surface.

24 Claims, 5 Drawing Figures

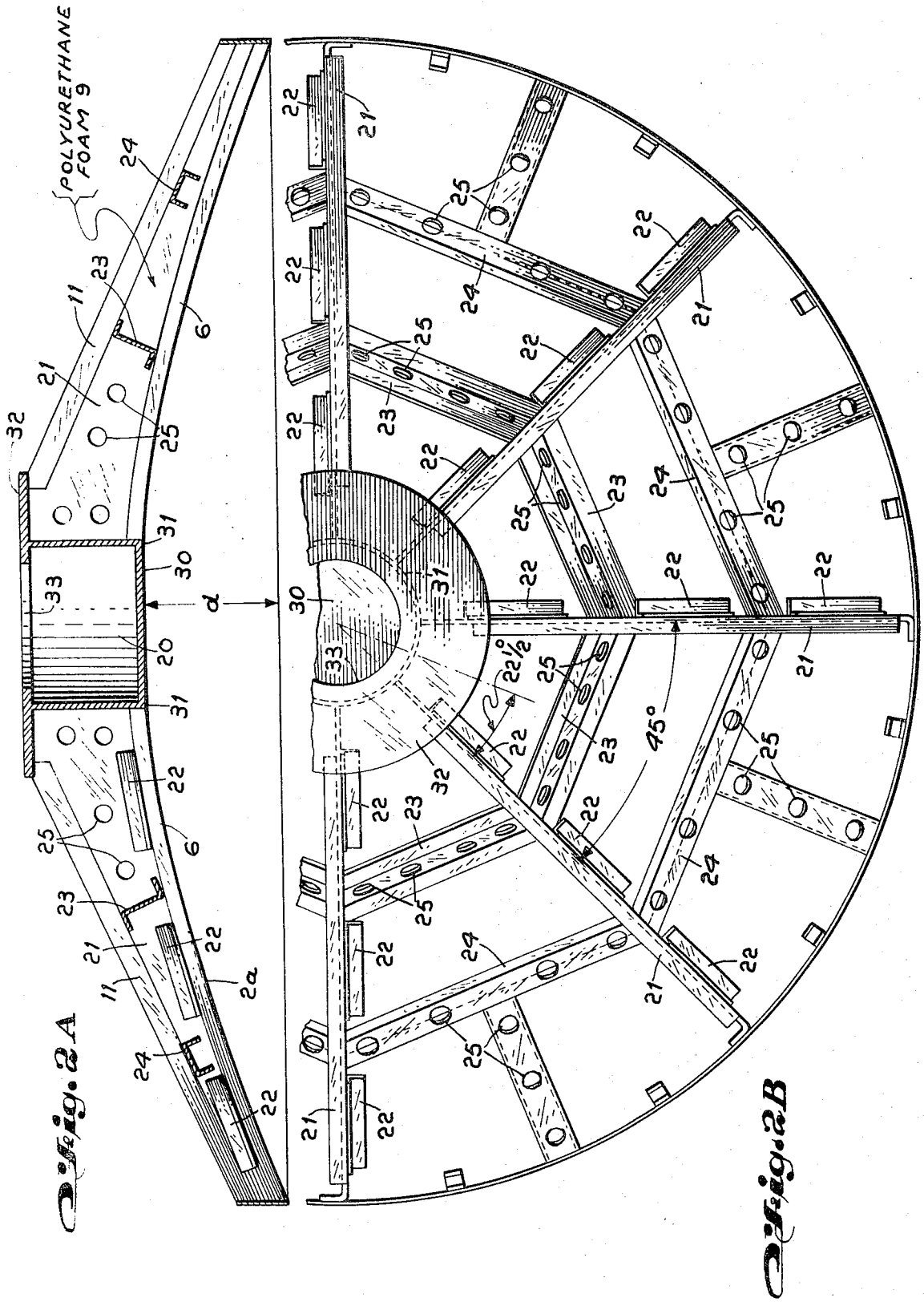

ON-SITE FABRICATION OF ANTENNAS

BACKGROUND OF THE INVENTION

This invention relates to the construction of antenna structures, and more particularly to the use of an inflatable mold or pattern to form a contoured surface adaptable for casting an antenna reflector (or radome).

With the advent of the space/satellite communications era, the demand for more, as well as less expensive, earth stations has ever increasingly been realized. The largest single, most costly, and complex component of a typical earth station is the antenna system. The size and configuration thereof varies perhaps from 25 feet to approximately 98.4 feet in diameter, and may range in weight from a few tons to nearly 1 million pounds. Deep space probe antennas (radio telescopes) have been built up to 2 and 3 hundred feet in diameter.

Of the current antenna configurations, which are many and varied, such as prime focus, Cassegrain, Gregorian, parabolic-Torus, Cassehorn, etc., one fundamental design/construction technique has been employed; that is: individual component hardware, such as reflector panels, support members, etc., is manufactured, shipped to the site, and there assembled and aligned. Shipping in many instances is quite costly, depending upon size, weight and the number of shipments, particularly if schedules require air transportation. Experience has shown that susceptibility to damage during sustained shipping is quite prevalent. Experience has additionally shown that missing and mismatched parts on site also create inflated expenses.

The requirements of mobility in many electronic communications and radar systems necessitates an antenna system that may readily be transported and assembled at a designated installation site. Formerly it has been the practice to fabricate the antenna reflector or radome structures of such mobile antenna systems in the factory, with the reflector then being shipped to the installation site as a unit or as a number of interlocking sections. The larger sizes now in demand make this prohibitive.

SUMMARY OF THE INVENTION

It is therefore the principal object of this invention to provide a novel construction technique implemented by a specific representative embodiment to minimize and virtually eliminate many of the aforementioned problems of conventional antenna construction without sacrificing technical performance.

The present invention increases the mobility capabilities of such systems by providing a truly tactical antenna system in which the antenna reflector is supplied as a compact kit of basically raw materials and necessary tooling for on-site fabrication.

An inflatable mold or pattern is used, which may be inflated with air to form an accurately contoured mold surface on which to construct a reflector surface. Such a mold/pattern is first inflated to a sufficient pressure to withstand the weight of casting material which is to be applied thereto in forming the reflector. Initially the surface has applied thereto a spray of polyester gel-coat or resin which is ultraviolet sensitized. Several applications of fiberglass-reinforced polyester resin are then made, to form a hard laminate shell. Apertured radial internal ribbing stiffeners are rough cut from plywood and are placed on and attached to the polyester resin-covered mold surface with the aid of fiberglass attachment fillets, the radial stiffeners providing substantial structural support. A casting material such as foamable polyurethane is then sprayed onto the contoured surface of the reflector to a sufficient depth. With the polyurethane foam cured, another laminate application of fiberglass reinforced polyester resin is then spray-applied. The inflatable mold or pattern is subsequently deflated, leaving a cast reflector surface which is a substantial duplicate of the image surface of the inflatable mold. A conductive reflecting agent is then applied to the reflector surface in an appropriate manner, such as sprayed aluminum.

Thus, according to the broader aspects of the invention there is provided a method for fabricating an antenna reflector having a reflector surface of predetermined parameters, comprising the steps of applying to a mold surface having a curvature corresponding to the predetermined parameters of the reflector surface a continuous layer of polyester material of predetermined thickness, applying a first layer of material comprising a fiber-reinforced resinous laminate to a predetermined thickness, embedding and forming into place individual pieces of an internal reinforcement ribbing structure of predetermined arrangement with a continuous foamable casting material, applying a second layer of material comprising a fiber-reinforced resinous laminate, and applying to the fabricated reflector surface a continuous layer of a reflecting agent.

Moreover, the invention provides an antenna reflector having a reflecting surface of predetermined parameters comprising a continuous layer of polyester material formed on a surface having a curvature corresponding to the predetermined parameters of the reflector surface, a first layer of fiber-reinforced resinous laminate, a layer of continuous foamed casting material of predetermined density, a second layer of fiber-reinforced resinous laminate, and a continuous layer of metallic reflecting agent on the reflecting surface of said reflector.

The present invention thus provides an improved method for manufacturing a cast antenna reflector of unique construction which is particularly adaptable for tactical antenna systems, and which permits complete fabrication of the antenna at a remote installation site. Prior art constructions rely principally, if not entirely, on the single casting of polyurethane foam as the structural foundation of the reflector. This has proved to be completely unacceptable for most practical considerations. The series of layers defined above according to the invention enable a practical realization of reflectors of appreciable size not available practically in the art.

A major feature of this invention is to provide a collapsible antenna structure pattern which comprises a pre-shaped mold constructed to be inflated to form a prescribed contoured surface for the casting of an antenna reflector.

The above-mentioned and other objects and features of this invention will become more apparent, and the invention itself better understood, by reference to the following description taken in conjunction with the accompanying drawings, in which:

FIGS. 1A and 1B schematically illustrate in cross-section a reflector structure on an air-inflatable mold;

FIGS. 2A and 2B schematically represent in cross-sectional and rear views respectively a reflector structure fabricated according to the invention; and FIG. 3 is a fractional view in cross-section of a fabricated reflector structure situated on the air-inflatable mold.

DESCRIPTION OF THE PREFERRED EMBODIMENT

Figure 1A:
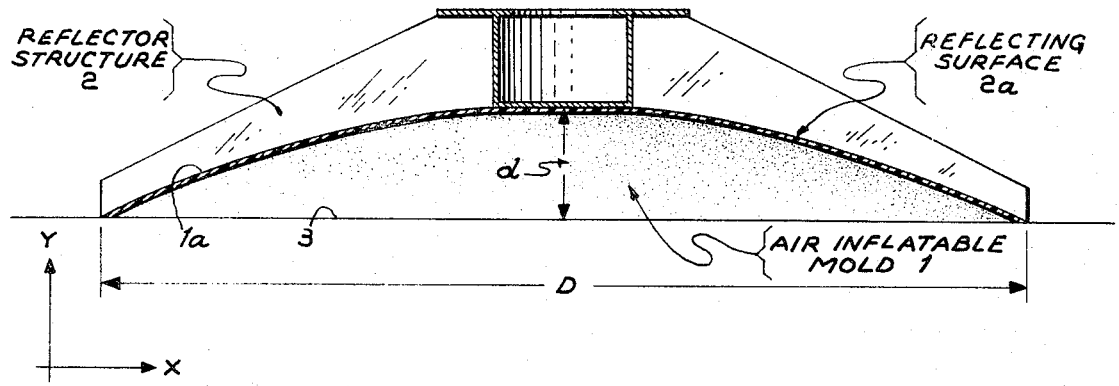
Figure 1B:
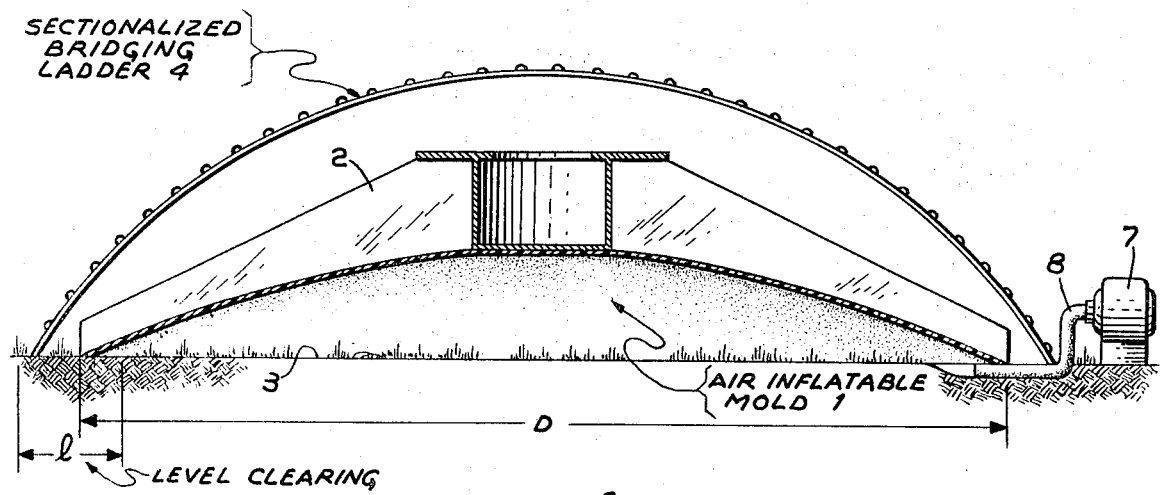

FIGS. 1A and 1B show in cross-section the collapsible mold/pattern in the fully inflated state. The mold is formed of a bag-like enclosure 1 constructed preferably of a flexible, but non-elastic, material. The top surface 1a of member 1 is preshaped to form a mold surface upon which the antenna structure is to be cast. Although it is here illustratively given to be a paraboloid of revolution, it is to be understood that various other shapes and configurations may be formed from such a member 1 within the scope of this invention.

Mold 1 is inflated by any conventional means such as an air compressor 7 communicating with the under surface of the mold via a conduit 8 from outside. Alternatively the mold could be inflated with the compressor placed thereunder in the collapsed state, and communicating with the outside air via an intake conduit. The compressor however should be designed and constructed to pressurize mold 1 sufficiently to withstand the weight of all casting materials which are to be applied to form the reflector structure. In support thereof, a metallic shirt consisting of a number of flat arcuately shaped metallic weights may be laid around the mold on the edge thereof in a ring to provide sufficient stability during the inflating process and the fabrication of the reflector.

It is intended that all parameters of the antenna be predetermined, such as diameter, contour, F/D ratio, shaping, etc. An exemplary listing of specific antenna parameters is given in the following:

| | |
|---|---|
| Depth = d | 5.3 feet |
| Diameter = D | 30 feet |
| F/D ratio (Focus/Diameter) | 0.417 |
| Contour of reflecting surface | $Y^2 = 50 \times$ (in feet) |
| Surface accuracy | 0.060 inches r.m.s. |
| Frequency range | Up to 10 GHz |
| Gain | |
| . Transmit | 51 db at 6.38 GHz |
| . Receive | 48.8 db at 4 GHz |

From the above parameters, the air-inflatable structure to be used as a mold is then fabricated to correspond to specification.

The "kit" for the on-site fabrication of this antenna would consist essentially of raw chemical materials, tools, and the inflatable mold, and may specifically comprise the following:
- Mold releasing agent
- Polyester gel-coat or resin
- Polyester resin with ultraviolet retardant
- Fiberglass cloth or "yarn"
- Polyurethane foam (2-part)
- Spray guns for polyester resin, polyurethane, and metallizing
- Resin rollers (if fiberglass cloth rather than yarn is used)
- Portable bridging ladder assembly
- Scarfing equipment (sanders, etc.)
- Miscellaneous stiffener material (hardware, inserts, "hub", etc.)
- Air-inflatable mold The kit which would be shipped to the particular site location could be supplemented by local equipment which would be rented for the construction period, the local equipment consisting for instance of a portable generator, an air compressor, jacks, winches, etc. Also, the supports or stiffeners (plywood) which are to be foam-embedded into the antenna structure should be locally supplied.

It is intended that the finished product very nearly yields a 1/1 reproduction of the mold surface. The mold should preferably be capable of being deflated, stored and subsequently reused with no degradation. Also, the material used for the inflatable mold should be readily repairable in the event of punctures.

Figure 3:
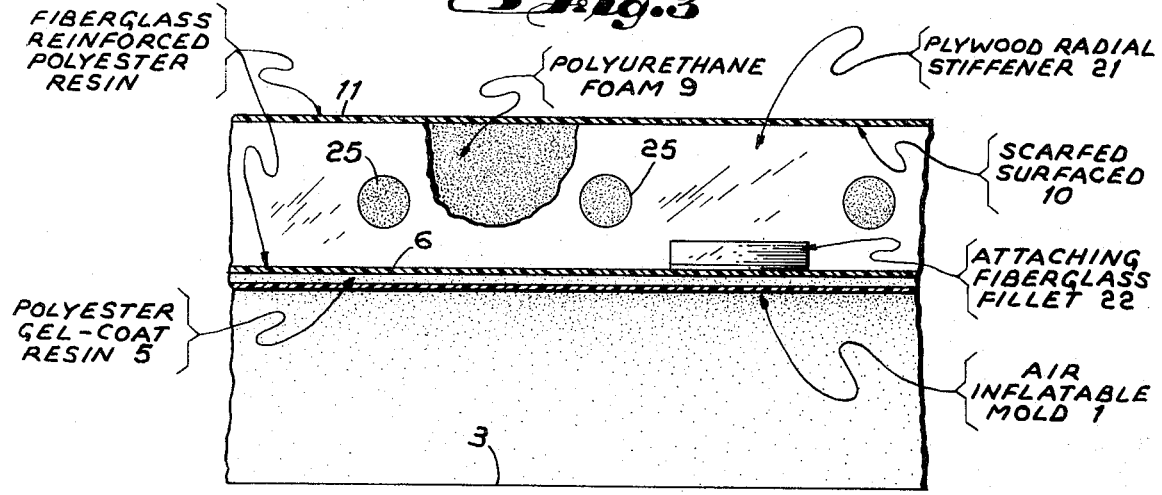

Referring now to FIGS. 2A, 2B and 3 in conjunction with FIGS. 1A and 1B, there is illustrated the inflatable mold 1 being utilized to form an antenna reflector in accordance with the present invention. Mold 1 is inflated to the sufficient pressure for withstanding the weight of the casting materials applied thereto without distorting reflector contoured surface 1A. Inflated mold 1 is positioned on a suitable support 3, which may typically be the ground (FIG. 1B). The site may require initial rough leveling; therefore a ring sector nominally 30 feet in diameter and 6 feet wide would be adequate for the example herein described. In setting up and inflating the mold on this sector, it is intended that the mold sub-assembly contain a variable pressurization and regulator system to compensate for air volume changes due to possible leakage as well as temperature and atmospheric changes. Hence, it is provided that the mold shape will not change during the fabrication of the reflector structure.

To facilitate the removal of mold 1 after the curing of the reflector cast thereon, a releasing agent is preferably applied to the molding surface 1a prior to the introduction of the fabricating materials. The releasing compound is preferably non-reactive with either the casting material or the material comprising the mold 1. An alternative approach to spraying the inflated mold with the releasing agent (e.g. teflon, silicon, grease, wax, etc.) is to impregnate the mold itself with the releasing agent.

It is advisable after inflating the mold to set up a bridging ladder 4 as shown in FIG. 1B which is included with the kit. By this device each portion of the mold surface 1a is within easy reach. Alternatively, a hydraulic lift (if available), such as is employed by repairmen in the maintenance of commercial telephone lines strung on telephone poles, could serve this purpose. Moreover, it is not beyond the scope of this invention to alternatively utilize an extended, lightweight, telescoping spray nozzle and assembly by which the operator could easily reach all portions of the mold surface from various positions along the side of the inflated mold, and perhaps from a portable raised stand.

Beginning now the fabrication of the reflector structure 2 on the surface 1a of the inflated mold 1, an initial layer of polyester gel-coat or polyester resin, containing an ultraviolet sensitizer (repellant), is spray-applied. We have found by experiment that it is preferable to attain a layer thickness of 0.005 inches, and that three such layers should be applied, achieving an overall intended thickness of 0.015 inches. The inclusion of the ultraviolet sensitizer in this initial (and therefore outer) reflector surface layer is to protect the principle inner casting of polyurethane foam (to be described below) from deterioration by U.V. radiation. By this initial application, then, there is provided protection of the inner layers of the reflector structure from U.V. radiation, and also a smooth-finished and desirably hard outside or skin-like layer. This initial layer also assists in separating the fabricated reflector from the mold. Whereas the use of polyester gel-coat yields a hard finish, the polyester resin produces a finish which is less hard but provides advantageous adhesive properties for the type of construction described herein. A hardness bordering on glass-like brittleness may be avoided in either case by application in thin layers as described above.

After this initial spraying operation there is of course a required waiting time for the application to dry; a satisfactory drying time for the three above-mentioned applied layers is 1 to 2 hours. These layers are represented in FIG. 3 as polyester gel-coat/resin 5.

Once the initial layer of polyester gel-coat or resin has dried, the next step in fabrication is to spray-apply fiber-reinforced polyester resin in a laminate fashion thereon. This second layer provides the principal structural stability of the reflector by providing a strong, hard shell. Preferably the spray application of fiber-reinforced polyester resin should, for each of several (typically three) complete layers, be in sections starting at the vertex 20 (see FIGS. 2A and 2B) and gradually working radially and circumferentially outward. This provides the easiest application and best drying technique. Shrinkage, if any, comes from the manner of application with this type of material, and the defined manner of application here provides the best control as far as minimizing shrinkage is concerned. Fiberglass strands are to be sprayed-on in conjunction with the polyester resin, using the "chopper" technique, i.e. along with a feed of the polyester resin to a principal spray nozzle, there is provided a fiberglass strand feed, wherein fiberglass "yarn" is chopped into pieces of desirable length and "force-fed" to the principal nozzle. In this manner, each complete application of fiberglass-reinforced polyester resin is laid down over the initial U.V. sensitized polyester gel-coat (or polyester resin) layer, to form a laminate type layer. Of course, curing time is required between each of the fiber-reinforced applications, typically 2 hours.

Alternatively, fiberglass cloth (e.g. 1½ ounces/ft$^2$) may be laid-on by hand for each application, with polyester resin being sprayed-on before and after each fiber cloth layer. Rolling and de-aeration should particularly accompany the applications of fiberglass cloth; this step may be dispensed with in the spray application of fiberglass strands. The steps for the application of the fiberglass-reinforced polyester resin are, as already mentioned, to be repeated until preferably at least three layers are completed (the total for the three layers being about one-eighth inch thick). Once curing thereof has occurred (2 hours for each application), the structure becomes adequately self-supporting, and could at this point be walked-on or loaded. This fiberglass-reinforced polyester resin is designated in FIG. 3 as layer 6.

Prior to the application of the next and principal casting layer onto the mold 1, a plurality of radial stiffeners 21, constituting part of a reinforcement arrangement, is placed on the polyester-sprayed surface. At this time, or preferably even right after the above-mentioned application of the releasing agent onto the mold surface, a structural mount, also referred to hereinafter as "the hub," is to be placed at the vertex, i.e. the center of the mold surface. The radial internal ribbing stiffeners 21 (FIGS. 2A and 2B) may be constructed from any suitable lightweight material acquired locally, such as plywood (e.g. three-quarter inches thick), wherein they may be rough cut on the mold to correspond at least on the contacting surface with the intended reflector structure's contour. As shown in FIG. 2A, these radial stiffeners 21 are preferably arranged 45° apart. They are attached to the sprayed surface by spraying or laying up fiberglass attachment fillets 22 from the ribbing structure to the one-eighth inch fiberglass-reinforced shell 6, and allowing same to cure. The fillets of fiber cloth 22 are essentially laid in an L-shape and, when sprayed almost to saturation with polyester resin, become strong, bracket-like, lightweight adhesive pieces which, when applied to the radial stiffeners in spaced apart arrangement as shown, firmly hold the latter in place until and as the principal casting material of polyurethane foam is applied. Moreover, the fillets provide significant additional broad area in contact with the principal cast layer of polyurethane foam which tends to protectively soften the "sharper" contact offered by the reinforcement pieces.

Additional reinforcement ribbing, is to be assembled as shown by the concentrically arranged pieces designated 23 and 24 in FIG. 2B. In smaller diameter dishes, say up to 50 feet, the reinforcement ribbing is not essential in cases where a high density foam is to be used as the principal casting material. However, with lower density foams and/or larger diameter dishes, the reinforcement is needed, with the principal reinforcing pieces being the radials. They tend to stabilize and distribute stress, most of which is characteristically radial in a parabolic structure. Thus, the concentrically arranged reinforcement pieces are a secondary support, and principally combat circumferential spreading. The radially and concentrically arranged reinforcement pieces may typically be of I-type cross-section, or any other suitable cross-section such as L, Z or U shapes, the latter two shapes being specifically illustrated in FIGS. 2A and 2B.

The reinforcement ribbing is embedded and foamed in place using the polyurethane foam 9 (e.g. 4 lbs/ft$^3$). This application is to be done in sections and in several passes, working circumferentially and radially out from the vertex 20. The concentrically arranged ribbing pieces 23, 24 are at this time put down section-by-section. An additional practical feature of the radial stiffeners 21 and/or reinforcing members 23, 24 is that they may be cut or dimensioned so as to provide an indication of how deep to apply the polyurethane foam 9. In the alternative, the various pieces 21, 23, 24 of reinforcement structure could have depth markings placed or made thereon for this purpose. Moreover, the reinforcing pieces could have been precut and shipped to the installation site as part of the above-mentioned kit. In any event, it is preferable to have apertures 25 therethrough to provide continuity of the foam 9 between the sections thereof as they cure, thus increasing the structural stability and soundness of the reflector. See FIG. 3 in this regard. Perhaps 24 hours should be allowed for curing and stabilization following the application of the polyurethane foam.

Yet another alternative regarding the individual reinforcing pieces would be to fabricate same by spraying fiberglass-reinforced polyester resin over simple, inexpensive inflatable rib structure supplied in the kit.

The structural mount or "hub" mentioned hereinbefore (see FIGS. 2A and 2B) comprises a circular steel baseplate 30, a cylindrical side structure 31, and a circular steel backplate 32 having a centered aperture 33 therein. The hub is to be assembled and placed on the fiberglass-reinforced polyester shell at the vertex 20, as mentioned, prior to the application of the polyurethane foam 9. This structure (30–33) is provided to facilitate the mounting of the completed reflector to an antenna mount assembly. A cylindrical cavity is formed by this hub structure at the vertex of the antenna reflector, with access thereto via the aperture 33 in the backplate 32. This cavity may conveniently be used for storage of communications transmitting and/or receiving equipment. This is a particularly advantageous storage facility (as well as equipment protection) in that by its location at the vertex 20, there is required a minimum of cabling to the active parts of the antenna, thus minimizing impedance losses.

From experiment in the spray-gun application of the polyurethane foam 9, we have found that 30 psi is a good working pressure. Expansion of the foam takes place during the initial two minutes following application. Curing is final after 48 hours on the air-inflated mold. It is recommended that all spraying and curing on the mold be at ambient room conditions. The exothermal foaming action well known to the art occurs for perhaps a 30 minute period during which temperatures up to +150°F may be experienced.

As indicated hereinbefore, the polyurethane casting material is shipped to the site via the kit in a raw material state. Since this material is foamable, it is to be appreciated that a substantial space saving is effected by shipping it in the raw state to the installation site, where it is then foamed in the construction of the reflector.

It is desirable to scarf-down or sand away excess polyurethane and to remove the dust and loose particles to form a scarfed surface 10 (FIG. 3). Following this, another layer of fiberglass-reinforced polyester resin is to be applied; the procedure and sequence of application described for the previous layer of fiber-reinforced polyester is to be here employed, i.e., three basic layers totaling approximately one-eighth inch thick. However, ultraviolet sensitizer material is to be added to the fiber-reinforced polyester resin spray in this application. In this way, protection of the polyurethane foam layer 9 from U.V. radiation is effected as well from the rear of the reflector by this shell-like back layer, which layer of course provides all of the advantages indicated hereinbefore with reference to the initial fiber-reinforced resinous layer. FIG. 3 closely shows this second fiber-reinforced polyester resin layer, designated as 11. Again, about 6 hours of curing time for this second fiber-reinforced laminate layer should be scheduled.

The mold 1 is finally deflated, following the application of layer 11. While it is possible to have deflated the mold at any time after the initial application of fiber-reinforced polyester resin, practically speaking this would be undesirable. Continuance of the mold in the regulated inflated state insures a structural soundness and continuity in fabrication, guards against shrinkages, and protects from possible damage during fabrication from falling tools and other objects. The cast antenna reflector 2 has an internally concave parabolic surface corresponding 1/1 to the image contour of the convex mold surface 1a. The parabolic reflecting surface 2a is nominally contoured according to the equation $Y^2 = 50 \times X$ (in feet), and where the F/D ratio approximately equals 0.417, with Y = the ordinate dimension in FIG. 1A;
X = the abcissa dimension in FIG. 1A;
F = focal length (in feet);
D = diameter of the parabolic reflector.

The reflector surface 2a should be touched up as required with polyester resin containing an ultraviolet sensitizer, when the mold has been deflated. The entire reflecting surface is then sprayed with aluminum to a depth say of 0.005 inches. As a practical matter, these last two applications to the reflector surface 2a would be made after the reflector has been coupled to its mount assembly, with the erection of the latter removing the reflector 2 from the ground 3, and thereby exposing the reflector surface 2a to be easily worked on. The use of aluminum for this final spray application is merely exemplary of any suitable material which would provide a reflecting surface 2a having the requisite electrical characteristics for impinging radiation.

It is therefore seen that the instant invention permits the utilization, in the field, of basic raw materials to form a uniquely constructed antenna structure such as a parabolic reflector type antenna by a novel construction technique. An inflatable mold having the requisite contours of the structure to be fabricated is used. The invention perhaps has its greatest value in the formation of the very large reflectors, say approximately 98.4 feet or more in diameter, wherein factory fabrication and subsequent shipment becomes unfeasible and/or extremely costly.

While the principles of this invention have been described above with reference to specific apparatus, materials and steps, it is to be understood that such is made by way of example only, and is not to be considered as limiting on the scope of the invention as set forth in the appended claims.

We claim:

1. A method for fabricating an antenna reflector having a reflector surface of predetermined parameters, comprising the steps of:
   a. applying to a mold surface having a curvature corresponding to the predetermined parameters of the reflector surface a continuous layer of polyester material of predetermined thickness;
   b. applying a first layer of material comprising a fiber-reinforced resinous laminate to a predetermined thickness;
   c. embedding into place individual pieces of an internal reinforcement ribbing structure of predetermined arrangement in a continuous foamable casting material;
   d. applying a second layer of material comprising a fiber-reinforced resinous laminate; and
   e. applying to the fabricated reflector surface a continuous layer of a reflecting agent.

2. A method for fabricating a dish-shaped antenna reflector having a reflector surface of predetermined parameters, comprising the steps of:
   a. fabricating an inflatable mold structure which has in the inflated state a mold surface which corresponds to the predetermined parameters of the reflector surface, and inflating the fabricated mold;

b. applying to the mold surface a continuous layer of polyester resin gel-coat to a predetermined thickness;

c. applying a first layer of material comprising a fiber-reinforced resinous laminate to a predetermined thickness;

d. embedding into place radially and concentrically arranged internal reinforcement ribbing pieces in a continuous foamable casting substance;

e. applying a second layer of material comprising a fiber-reinforced resinous laminate; and f. deflating the mold and applying to the fabricated reflector surface a reflecting agent which satisfies electrical predetermined parameters of the antenna reflector.

3. The method according to claim 2 wherein the continuous foamable casting substance is polyurethane foam, and further including securing at least the radial ones of said ribbing pieces to the mold surface by way of fiber cloth fillets prior to the application of the polyurethane foam.

4. The method according to claim 3 wherein the polyurethane foam is sectionally applied, working circumferentially and radially outward from the center of the mold surface to the edges thereof, with the concentrically arranged ribbing pieces being correspondingly arranged in place in the sectional applications.

5. The method according to claim 4 further including allowing a predetermined time for curing and stabilization to occur before proceeding with the application of said second layer of fiber-reinforced resinous laminate.

6. The method according to claim 4 further including removing excess polyurethane, dust and loose particles prior to the application of said second layer of fiber-reinforced resinous laminate.

7. The method according to claim 4 further including constructing the radially and concentrically arranged reinforcement ribbing pieces with apertures therein so as to provide a continuity in the polyurethane foam between sections.

8. The method according to claim 7 wherein said ribbing pieces are constructed from lightweight plywood.

9. The method according to claim 7 wherein said ribbing pieces are fabricated by spray-applying a fiber-reinforced resinous material over inflatable rib structures.

10. The method according to claim 2 wherein the center area of the mold surface corresponds to the vertex of the reflector surface, and further including placing a structural mount, for mounting the antenna reflector to a mount assembly, at the vertex and embedding partially into place said structural mount along with said ribbing pieces.

11. The method according to claim 2 wherein a releasing agent is applied to the mold surface prior to the application of the continuous layer of polyester material thereto, so as to effect a separation of the fabricated reflector from the mold without difficulty.

12. The method according to claim 11 wherein the mold is impregnated with the releasing agent.

13. The method according to claim 11 further including providing the inflated mold with a variable pressurization and regulator system for compensating for volume changes in the mold due to leakage of the mold inflatant, temperature or atmospheric pressure changes etc., so as to render the mold shape unchanging in the inflated state.

14. The method according to claim 11 wherein said continuous layer of polyester material is applied in a plurality of successive layers each having substantially equal and predetermined depth.

15. The method according to claim 14 wherein an ultraviolet radiation repellant is included with said polyester material.

16. The method according to claim 11 wherein the resinous laminate of said first and second layers thereof is comprised of polyester resin, and wherein the polyester resin is applied starting substantially at the center of the mold surface and gradually winding radially and circumferentially outward in sections.

17. The method according to claim 16 wherein the fiber-reinforcement of the resinous laminate is provided by fiberglass strands applied in conjunction with the polyester resin.

18. The method according to claim 16 wherein the fiber-reinforcement of the resinous laminate is provided by fiberglass cloth laid in conjunction with the polyester resin.

19. The method according to claim 18 further including rolling and deaerating in conjunction with the application of the polyester resin and the fiberglass cloth reinforcement.

20. The method according to claim 17 wherein said fiber-reinforced polyester resin is applied in a predetermined number of successive layers each having substantially the same depth, and where said second fiber-reinforced resinous laminate includes an ultraviolet radiation repellant.

21. The method according to claim 17 further including touching-up the reflector surface, following deflation of the mold, as required with polyester resin containing an ultraviolet radiation repellant.

22. The method according to claim 19 wherein the reflecting agent is applied on the reflector surface by spray-metalizing with aluminum to a predetermined thickness.

23. The method according to claim 17 wherein the application of the continuous layer of polyester material on the mold surface, the application of the first and second layers of fiber-reinforced resinous laminate, and the application of the continuous foamable casting substance are effected by spray application.

24. A method for fabricating an antenna reflector having a reflector surface of predetermined parameters, comprising the steps of:

a. applying to a mold surface having a curvature corresponding to the predetermined parameters of the reflector surface a continuous layer of polyester material having an ultraviolet radiation repellant to a predetermined thickness;

b. applying a first layer of material comprising a fiber-reinforced resinous laminate to a predetermined thickness;

c. applying a layer of continuous foamable casting material having a predetermined density and thickness;

d. applying a second layer of material comprising a fiber-reinforced resinous laminate to a predetermined thickness, said second layer of material including an ultraviolet radiation repellant; and e. applying to the fabricated reflector surface a continuous layer of a reflecting agent.

* * * * *